US012738658B2

(12) United States Patent
Leung et al.

(10) Patent No.: US 12,738,658 B2
(45) Date of Patent: Sep. 15, 2026

(54) GAIN-ENHANCED LOW-PROFILE DIELECTRIC RESONATOR ANTENNA WITH A LOADING METAL

(71) Applicant: City University of Hong Kong, Kowloon (HK)

(72) Inventors: Kwok Wa Leung, Kowloon Tong (HK); Zhili Su, Kowloon Tong (HK); Kai Lu, Guangzhou (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 95 days.

(21) Appl. No.: 18/760,103

(22) Filed: Jul. 1, 2024

(65) Prior Publication Data

US 2026/0005441 A1 Jan. 1, 2026

(51) Int. Cl.
*H01Q 9/04* (2006.01)
*H01Q 1/42* (2006.01)

(52) U.S. Cl.
CPC .......... *H01Q 9/0485* (2013.01); *H01Q 1/422* (2013.01)

(58) Field of Classification Search
CPC .... H01Q 9/0485; H01Q 1/422; H01Q 21/065; H01Q 9/0407
See application file for complete search history.

(56) References Cited

U.S. PATENT DOCUMENTS 11,929,563 B2 3/2024 Leung et al.
2005/0264449 A1 12/2005 Strickland

FOREIGN PATENT DOCUMENTS

CN 111916906 A 11/2020
CN 212485555 U 2/2021
CN 116937166 A 10/2023

OTHER PUBLICATIONS

Zhang et al. "Advanced Dielectric Resonator Antenna Technology for 5G & 6G Applications" (Year: 2024).*
A series-fed linear substrate-integrated dielectric resonator antenna array for millimeter-wave applicationsâ, Gong et al. (Year: 2018).*
Gain enhancement in linear and circularly polarized microstrip patch antennas using shorted metallic patches, Fallah-Rad (Year: 2005).*
Microstrip patch antenna miniaturization techniques: a review, Kahn (Year: 2015).*
28 GHz Substrate-Integrated Filtering Dielectric Resonator Antenna Array, Liu (Year: 2022).*

(Continued)

*Primary Examiner* — Dimary S Lopez Cruz
*Assistant Examiner* — Anna N Hamadyk
(74) *Attorney, Agent, or Firm* — Merchant & Gould P.C.

(57) ABSTRACT

A substrate-integrated dielectric resonator, which includes a first substrate layer having a first dielectric constant, and a plurality of metallic patches on a first side of the first substrate layer. The plurality of metallic patches is separated from each other, and is shorted to ground. A dielectric resonator antenna incorporating such a resonator is also described. The DRA has a low profile with an enhanced gain. The DRA can be easily fabricated using low-cost PCB technology. By adding shorted metallic patches to the DR without increasing the antenna size, the gain of DRA is obviously increased.

16 Claims, 14 Drawing Sheets

(56) References Cited

OTHER PUBLICATIONS

Ahn et al., "Pattern Reconfigurable High Gain Spherical Dielectric Resonator Antenna Operating on Higher Order Mode," IEEE Antennas Wirel. Propag. Lett., vol. 18, No. 1, pp. 128-132, Jan. 2019.
Baldazzi et al., "A High-Gain Dielectric Resonator Antenna With Plastic-Based Conical Horn for Millimeter-Wave Applications," IEEE Antennas Wirel. Propag. Lett., vol. 19, No. 6, pp. 949-953, Jun. 2020.
Denidni et al., "Hybrid Dielectric Resonator Antenna With Circular Mushroom-Like Structure for Gain Improvement," IEEE Trans. Antennas Propag., vol. 57, No. 4, pp. 1043-1049, Apr. 2009.
Fakhte et al., "High Gain Rectangular Dielectric Resonator Antenna Using Uniaxial Material at Fundamental Mode," IEEE Trans. Antennas Propag., vol. 65, No. 1, pp. 342-347, Jan. 2017.
Guo et al., "Low-Profile and Broadband Dielectric Resonator Antenna Using Higher-Order Modes," IEEE Antennas Wirel. Propag. Lett., vol. 20, No. 10, pp. 1988-1992, Oct. 2021.
Hu et al., "A Compact Filtering Dielectric Resonator Antenna With Wide Bandwidth and High Gain," IEEE Trans. Antennas Propag., vol. 64, No. 8, pp. 3645-3651, 2016.
Kremer et al., "Compact Wideband Low-Profile Single- and Dual-Polarized Dielectric Resonator Antennas Using Dielectric and Air Vias," IEEE Trans. Antennas Propag., vol. 69, No. 12, pp. 8182-8193, 2021.
Kremer et al., "Design of Substrate Integrated Dielectric Resonator Antenna With Dielectric Vias," IEEE Trans. Antennas Propag., pp. 1-1, 2021.
Long et al., "The resonant cylindrical dielectric cavity antenna," IEEE Trans. Antennas Propag., vol. 31, No. 3, pp. 406-412, May 1983.
Mrnka et al., "Enhanced-Gain Dielectric Resonator Antenna Based on the Combination of Higher-Order Modes," IEEE Antennas Wirel. Propag. Lett., vol. 15, pp. 710-713, 2016.
Nasimuddin, "A Low-Profile Compact Microwave Antenna With High Gain and Wide Bandwidth," IEEE Trans. Antennas Propag., vol. 55, No. 6, pp. 1880-1883, Jun. 2007.
Pan et al., "A Low-Profile Stacked Dielectric Resonator Antenna With High-Gain and Wide Bandwidth," IEEE Antennas Wirel. Propag. Lett., vol. 15, pp. 68-71, 2016.
Perron et al., "High-Gain Hybrid Dielectric Resonator Antenna for Millimeter-Wave Applications: Design and Implementation," IEEE Trans. Antennas Propag., vol. 57, No. 10, pp. 2882-2892, Oct. 2009.
Petosa et al., "Rectangular Dielectric Resonator Antennas With Enhanced Gain," IEEE Trans. Antennas Propag., vol. 59, No. 4, pp. 1385-1389, Apr. 2011.
Petosa, A., Dielectric resonator antenna handbook. Boston: Artech House, 2007.
Tang et al., "Wideband Substrate Integrated Differential Dual-Polarized Dielectric Resonator Antenna," IEEE Antennas Wirel. Propag. Lett., vol. 21, No. 1, pp. 203-207, 2022.
Wang et al., "Stable High-Gain Linearly and Circularly Polarized Dielectric Resonator Antennas Based on Multiple High-Order Modes," IEEE Trans. Antennas Propag., vol. 70, No. 12, pp. 12270-12275, Dec. 2022.
Zhang et al., "A Low-Profile Filtering Dielectric Resonator Antenna Based on Metal Bridge Loading," IEEE Antennas Wirel. Propag. Lett., vol. 23, No. 2, pp. 513-517, Feb. 2024.
Zhang et al., "Compact and Broadband Substrate Integrated Dielectric Resonator Antenna Suitable for 5G Millimeter-Wave Communications," IEEE Open J. Antennas Propag., vol. 4, pp. 982-989, 2023.

* cited by examiner

GAIN-ENHANCED LOW-PROFILE DIELECTRIC RESONATOR ANTENNA WITH A LOADING METAL

FIELD OF INVENTION

This invention relates to resonators and resonator antennas. These may be radio frequency (RF) devices, and the invention may be applicable to miniaturized antennas.

BACKGROUND OF INVENTION

Since dielectric resonator (DR) antenna (DRA) was first proposed by S. A. Long [1], it has gained great attention due to its various advantages, such as low loss, compact size, lightweight, and ease of excitation. However, a conventional DRA usually has a relatively low gain of ~5 dBi, which limits its application in some scenarios. Different technologies have been developed to increase the antenna gain. For instance, a plastic conical horn was loaded above a cylindrical DRA to enhance the gain [2]. Similarly, a surface-mounted metallic short horn was introduced to surround the cross DRA for gain enhancement [3]. In [4], an electromagnetic bandgap (EBG) layer was located underneath the cylindrical DRA for a higher gain. Uniaxial anisotropic materials have been employed to strengthen the side radiation of DRA for gain enhancement [5]. In [6], two sets of microstrip-fed apertures with in-phase excitation were designed to increase the DRA gain. Another practical approach to obtain a high gain is to operate at the higher-order modes [7]-[12]. The $TE_{\delta 15}$ mode of a tall rectangular DRA was explored in [7], whereas the $HEM_{15\delta}$ mode of a ring DRA was investigated in [8]. In [9], the $TE_{301}$ mode of a spherical DRA was used to realize pattern reconfiguration. The combination of $HEM_{133}$ and $HEM_{123}$ modes was studied in a cylindrical DR [10]. However, most of the aforementioned DRAs have large antenna sizes.

Low profile is an attractive property for DRA [11]-[14]. In [11], one or more pairs of slots were etched on the top face of a low-profile rectangular DR for a high gain. [12] introduced a gain-enhanced DRA with a low profile, accomplished by employing two distinct dielectric layers. In [13], a segmented DR was utilized to maintain stable broadside radiation. In [14], a compact filtering DRA was presented using metal bridges. However, these low-profile designs usually have high fabrication complexity. To facilitate the fabrication process, a cost-effective approach is the use of substrate integrated DRA based on mature printed circuit board (PCB) technology [15]-[18]. Nevertheless, most of the reported substrate integrated DRAs have limited antenna gain, typically below 8 dBi.

REFERENCES

The following references are referred to throughout this specification, as indicated by the numbered brackets:

[1] S. A. Long, M. McAllister, and L. C. Shen, "The resonant cylindrical dielectric cavity antenna," IEEE Trans. Antennas Propag., vol. 31, no. 3, pp. 406-412, May 1983.0

[2] E. Baldazzi et al., "A High-Gain Dielectric Resonator Antenna With Plastic-Based Conical Horn for Millimeter-Wave Applications," IEEE Antennas Wirel. Propag. Lett., vol. 19, no. 6, pp. 949-953, June 2020.

[3] Nasimuddin and K. P. Esselle, "A Low-Profile Compact Microwave Antenna With High Gain and Wide Bandwidth," IEEE Trans. Antennas Propag., vol. 55, no. 6, pp. 1880-1883 June 2007.

[4] T. A. Denidni, Y. Coulibaly, and H. Boutayeb, "Hybrid Dielectric Resonator Antenna With Circular Mushroom-Like Structure for Gain Improvement," IEEE Trans. Antennas Propag., vol. 57, no. 4, pp. 1043-149 April 2009.

[5] S. Fakhte, H. Oraizi, and L. Matekovits, "High Gain Rectangular Dielectric Resonator Antenna Using Uniaxial Material at Fundamental Mode," IEEE Trans. Antennas Propag., vol. 65, no. 1, pp. 342-347, January 2017.

[6] P. F. Hu, Y. M. Pan, X. Y. Zhang, and S. Y. Zheng, "A Compact Filtering Dielectric Resonator Antenna With Wide Bandwidth and High Gain," IEEE Trans. Antennas Propag., vol. 64, no. 8, pp. 3645-3651, 2016.

[7] A. Petosa and S. Thirakoune, "Rectangular Dielectric Resonator Antennas With Enhanced Gain," IEEE Trans. Antennas Propag., vol. 59, no. 4, pp. 1385-1389 April 2011.

[8] A. Perron, T. A. Denidni, and A.-R. Sebak, "High-Gain Hybrid Dielectric Resonator Antenna for Millimeter-Wave Applications: Design and Implementation," IEEE Trans. Antennas Propag., vol. 57, no. 10, pp. 2882-2892 October 2009.

[9] B. K. Ahn, H.-W. Jo, J.-S. Yoo, J.-W. Yu, and H. L. Lee, "Pattern Reconfigurable High Gain Spherical Dielectric Resonator Antenna Operating on Higher Order Mode," IEEE Antennas Wirel. Propag. Lett., vol. 18, no. 1, pp. 128-132, January 2019.

[10] M. Mrnka and Z. Raida, "Enhanced-Gain Dielectric Resonator Antenna Based on the Combination of Higher-Order Modes," IEEE Antennas Wirel. Propag. Lett., vol. 15, pp. 710-713, 2016.

[11] L. Wang et al., "Stable High-Gain Linearly and Circularly Polarized Dielectric Resonator Antennas Based on Multiple High-Order Modes," IEEE Trans. Antennas Propag., vol. 70, no. 12, pp. 12270-12275, December 2022.

[12] Y. M. Pan and S. Y. Zheng, "A Low-Profile Stacked Dielectric Resonator Antenna With High-Gain and Wide Bandwidth," IEEE Antennas Wirel. Propag. Lett., vol. 15, pp. 68-71, 2016.

[13] L. Guo, C. Zhou, H. Li, P. Chu, and W. W. Yang, "Low-Profile and Broadband Dielectric Resonator Antenna Using Higher-Order Modes," IEEE Antennas Wirel. Propag. Lett., vol. 20, no. 10, pp. 1988-1992 October 2021.

[14] L. Zhang, D. Liu, J.-W. Liu, C.-T. Hui, and Z. Weng, "A Low-Profile Filtering Dielectric Resonator Antenna Based on Metal Bridge Loading," IEEE Antennas Wirel. Propag. Lett., vol. 23, no. 2, pp. 513-517, February 2024.

[15] H. I. Kremer, K. W. Leung, and M. W. K. Lee, "Design of Substrate Integrated Dielectric Resonator Antenna With Dielectric Vias," IEEE Trans. Antennas Propag., pp. 1-1, 2021.

[16] H. I. Kremer, K. W. Leung, and M. W. K. Lee, "Compact Wideband Low-Profile Single- and Dual-Polarized Dielectric Resonator Antennas Using Dielectric and Air Vias," IEEE Trans. Antennas Propag., vol. 69, no. 12, pp. 8182-8193, 2021.

[17] H. Tang, X. Deng, and J. Shi, "Wideband Substrate Integrated Differential Dual-Polarized Dielectric Resonator Antenna," IEEE Antennas Wirel. Propag. Lett., vol. 21, no. 1, pp. 203-207, 2022.

[18] J.-E. Zhang, Q. Zhang, W. Qin, W.-W. Yang, and J.-X. Chen, "Compact and Broadband Substrate Integrated Dielectric Resonator Antenna Suitable for 5G Millimeter-Wave Communications," IEEE Open J. Antennas Propag., vol. 4, pp. 982-989, 2023.

[19] A. Petosa, Dielectric resonator antenna handbook. Boston: Artech House, 2007.

SUMMARY OF INVENTION

Accordingly, the present invention, in one aspect, provides a substrate-integrated dielectric resonator, which includes a first substrate layer having a first dielectric constant, and a plurality of metallic patches on a first side of the first substrate layer. The plurality of metallic patches is separated from each other, and is shorted to ground.

In some embodiments, on each of the plurality of metallic patches there are formed a plurality of metallic vias that extend through the first substrate layer.

In some embodiments, the plurality of metallic vias on each of the plurality of metallic patches is aligned along a straight line.

In some embodiments, each of the plurality of metallic patches has a substantially square or rectangular shape. The plurality of metallic vias on each of the plurality of metallic patches is aligned parallel to and closer to one of four sides of the substantially square or rectangular shape than others of the four sides.

In some embodiments, at least one of the plurality of metallic patches has a substantially square shape, and at least another one of the plurality of metallic patches has a rectangular shape.

In some embodiments, the number of the plurality of metallic patches is six.

In some embodiments, the plurality of metallic patches together defines a substantially square shape on the first side of the first substrate layer.

In some embodiments, adjacent ones of the plurality of metallic patches are separated from each other at a same distance.

In some embodiments, the plurality of metallic patches includes a first group of the metallic patches and a second group of the metallic patches. The first group and the second group of metallic patches are symmetrical to each other about a virtual line that passes through a center of the first substrate layer.

In some embodiments, each of the first group and the second group includes three said metallic patches, including two rectangular metallic patches and a substantially square metallic patch placed in-between.

In some embodiments, on each of the plurality of metallic patches there are formed a plurality of metallic vias that extend through the first substrate layer. The metallic vias on the metallic patches in the first group are aligned along a straight line, and the metallic vias on the metallic patches in the second group are aligned along a straight line.

In some embodiments, the metallic vias on the metallic patches in the first group are symmetrical to the metallic vias on the metallic patches in the second group being aligned about the virtual line.

According to another aspect of the invention, there is provided a dielectric resonator antenna, which contains a substrate-integrated dielectric resonator as described above, as well as a second substrate layer arranged on a second side of a first substrate layer of the substrate-integrated dielectric resonator. The second substrate layer further includes a microstrip feedline; and an antenna ground plane.

In some embodiments, the second substrate layer has a second dielectric constant which is smaller than a first dielectric constant of the first substrate layer of the substrate-integrated dielectric resonator.

In some embodiments, the second substrate layer comprises a middle metal layer and a bottom metal layer respectively located on two sides of the second substrate layer.

In some embodiments, the middle metal layer is configured on one of the two sides of the second substrate layer that is facing and in contact with the second side of the first substrate layer. The middle metal layer acts as the antenna ground plane.

In some embodiments, the middle metal layer is formed with a coupling slot that has a longitudinal direction intersecting with that of the microstrip feedline.

In some embodiments, the middle metal layer is in electrical connection with a plurality of metallic vias that extend through the first substrate layer.

In some embodiments, the microstrip feedline is part of the bottom metal layer.

In some embodiments, the bottom metal layer further comprises a metallic pad as a mounting area for an external connector.

One can see that embodiments of the invention provide a low-profile DRA with enhanced gain. The DRA can be easily fabricated using low-cost PCB technology. By adding shorted metallic patches to the DR without increasing the antenna size, the gain of DRA is obviously increased.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which.

In the drawings, like numerals indicate like parts throughout the several embodiments described herein.

DETAILED DESCRIPTION

Referring now to FIGS. 1*a*-1*d* and 2*c*, in which the structure of a compact low-profile dielectric resonator antenna according to a first embodiment of the invention is shown. The antenna 20 is designed at X-band, and contains two PCB substrate layers, namely (from top to bottom) a first substrate layer 22, and a second substrate layer 24. The first substrate layer 22, together with various metallic patches 26*a*-26*f* and metallic vias 28 (which will be described in more details later) therein, form a substrate-integrated dielectric resonator, where "substrate-integrated" means that the resonator is formed in a dielectric substrate. The first substrate layer 22 and the second substrate layer 24 both have square shapes, but the first substrate layer 22 has a smaller footprint than the second substrate layer 24. The dielectric constant of the first substrate layer 22 is larger than that of the second substrate layer 24. In one exemplary implementation, the first substrate layer 22 has a dielectric constant of 10.2, and the second substrate layer 24 has a dielectric constant of 3.38.

Figure 1A:
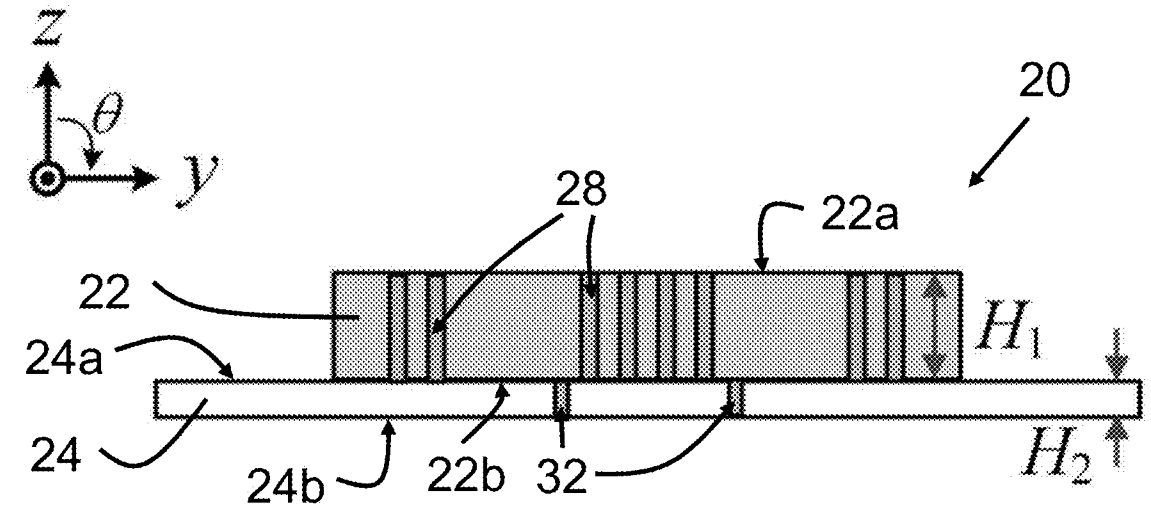
FIG. 1*a* is a side view of a dielectric resonator antenna according to an embodiment of the invention, with metallic vias in the antenna illustrated.
Figure 1B:
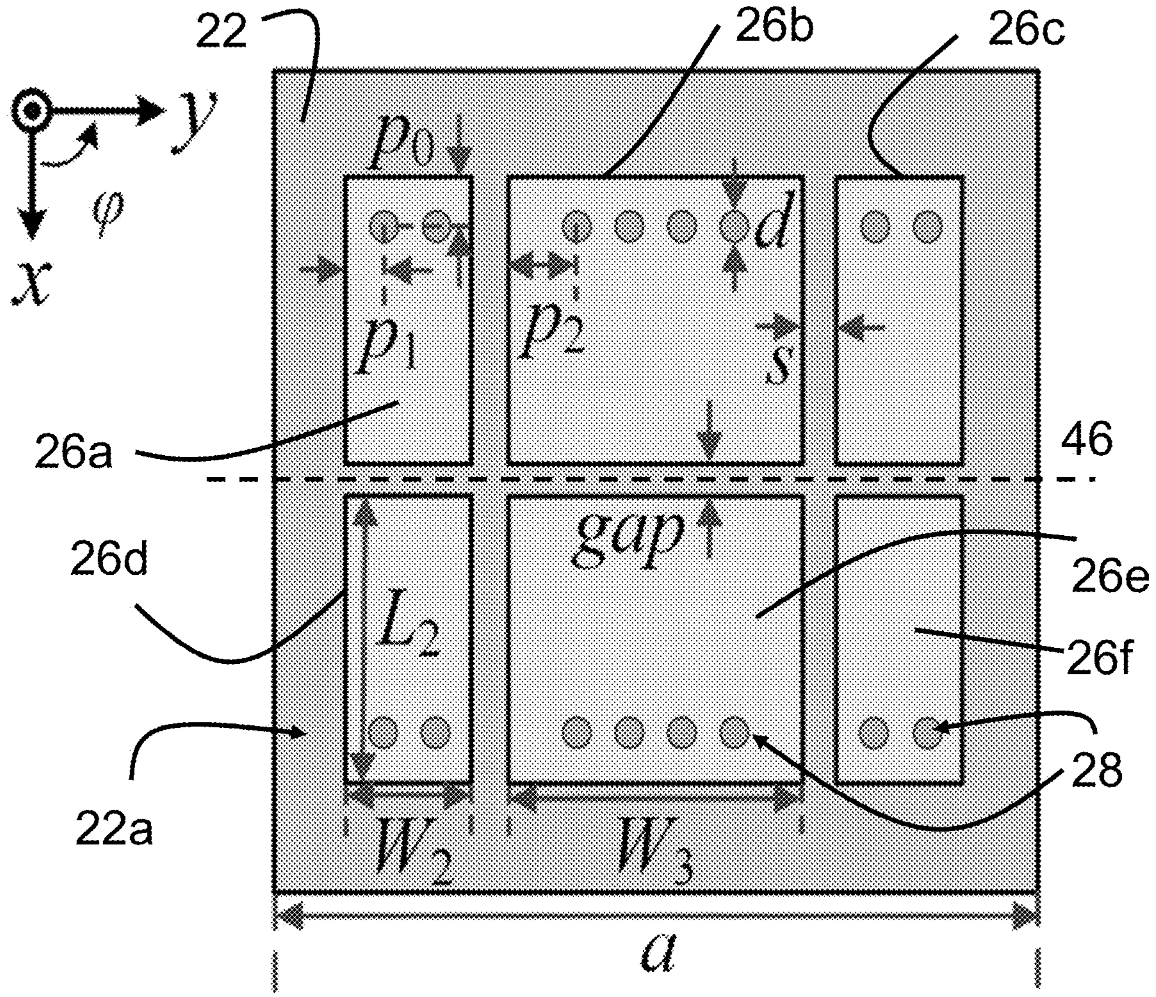
FIG. 1*b* is a top view of the first substrate layer of the antenna of FIG. 1*a*.
Figure 1C:
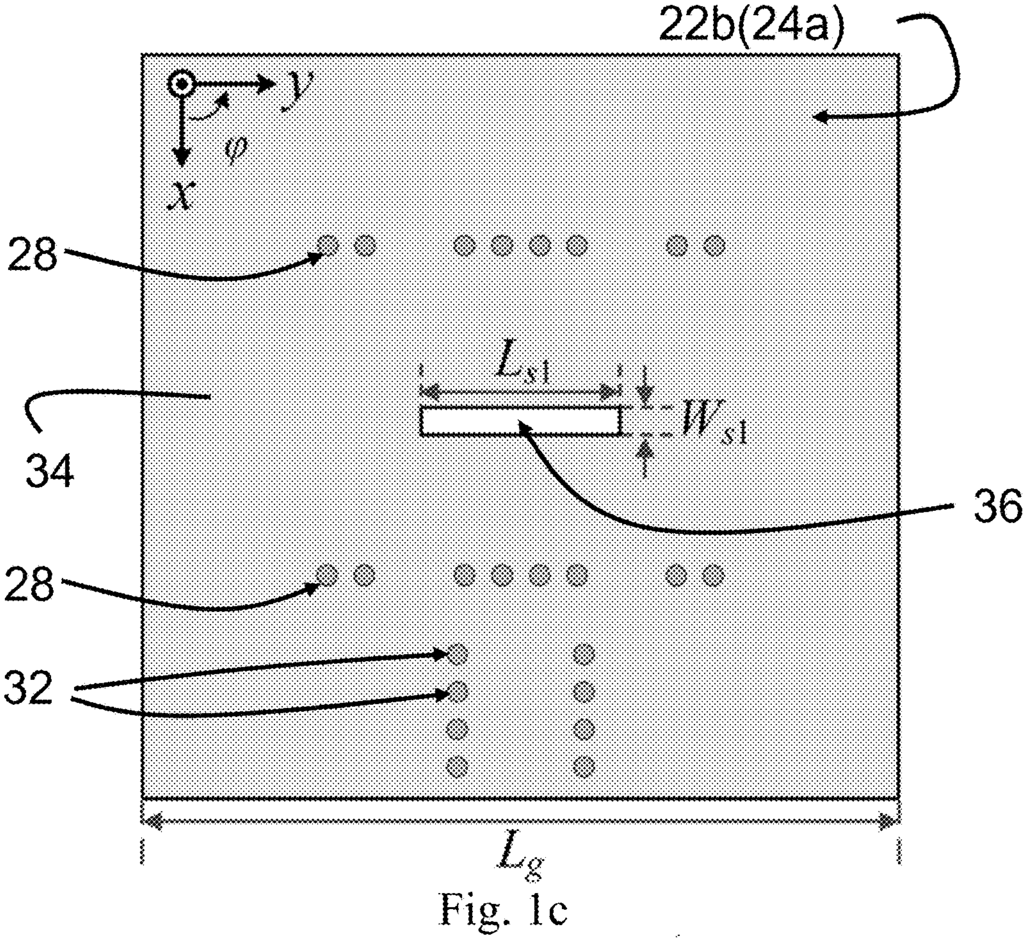
FIG. 1*c* is a top view of a middle metal layer in the antenna of FIG. 1*a*.
Figure 1D:
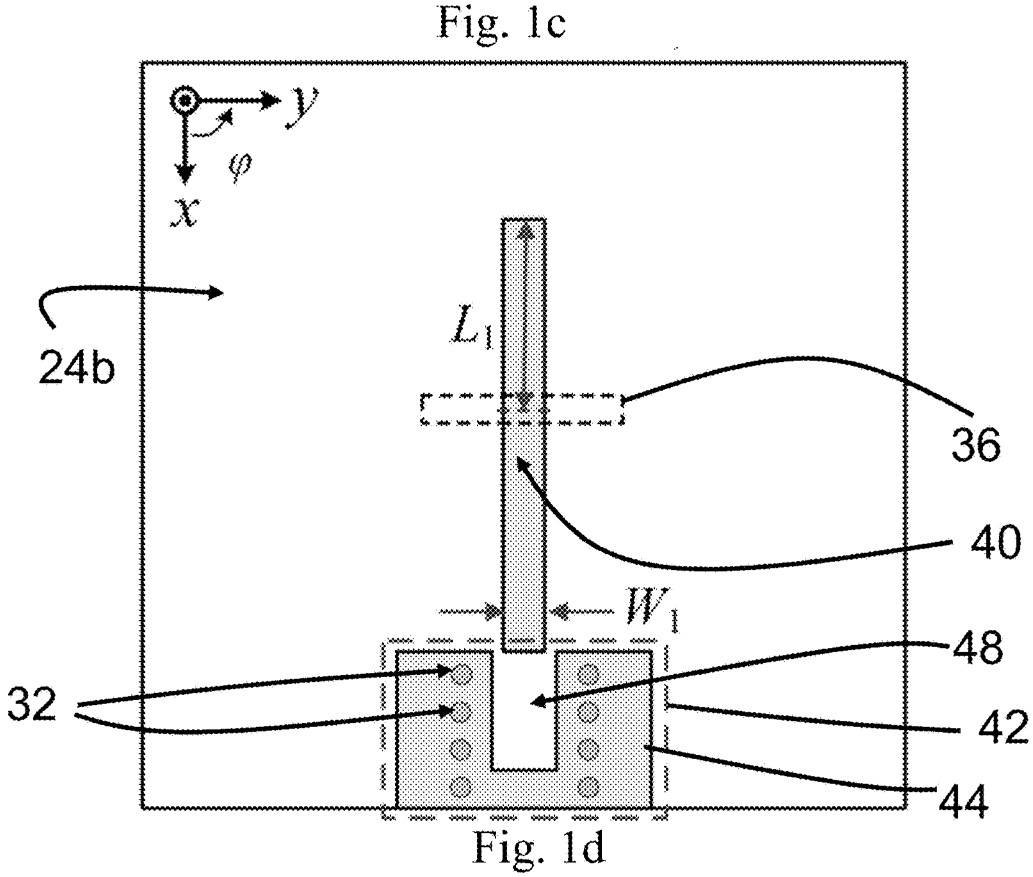
FIG. 1*d* is a top view of a bottom metal layer in the antenna of FIG. 1*a*.

The antenna 20 contains three metal layers (not shown in FIG. 1*a*), which are best illustrated respectively in FIGS. 1*b*, 1*c* and 1*d*. Firstly, on a top side 22*a* of the first substrate layer 22 which acts as a DR, there is configured a top metal layer that includes multiple metallic patches 26*a*-26*f* which are all shorted to ground. The metallic patches 26*a*-26*f* facilitate enhancing the gain of the antenna 20. As shown in FIG. 1*b*, the number of the metallic patches 26*a*-26*f* is six, which include metallic patches 26*b*, 26*e* that have substantially square shapes, and metallic patches 26*a*, 26*c*, 26*d*, 26*f* that have rectangular shapes. For each one of metallic patches 26*b*, 26*e* its four sides have similar dimensions ($L_2$ or $W_3$). For each one of the metallic patches 26*a*, 26*c*, 26*d*, 26*f* two of its sides ($L_2$) are much longer than the other two sides ($W_2$). However, all six metallic patches 26*a*-26*f* have their sizes in one dimension (which is the x-direction in FIG. 1*b*) to be the same, which is indicated by the length $L_2$ in FIG. 1*b*. The six metallic patches 26*a*-26*f*, while being separated from each other at the same distance (indicated by "gap" in FIG. 1*b*), together form a substantially square shape, which has a dimension of ($L_2$+$L_2$+gap) along the x-direction, and a dimension of ($W_2$+$W_2$+$W_3$+gap+gap) along the y-direction.

The six metallic patches 26*a*-26*f* can be divided into two group, with a first group including metallic patches 26*a*, 26*b* and 26*c*, while a second group including metallic patches 26*d*, 26*e* and 26*f*. The two groups are symmetrical about a virtual line 46 is located within a horizontal plane (i.e., a virtual plane not shown and parallel to each of the two PCB substrate layers 22, 24) and passes through a center (not shown) of the first substrate layer 22. The virtual line 46 extends in the y-direction. Because of the symmetry, the metallic patches 26*a* and 26*d* are aligned on the y-direction, and so are the metallic patches 26*b* and 26*e*, as well as the metallic patches 26*c* and 26*f*. The metallic patch 26*b* that has a substantially square shape is located between the two metallic patches 26*a*, 26*c* that have rectangular shapes. The metallic patch 26*e* that has a substantially square shape is located between the two metallic patches 26*d*, 26*f* that have rectangular shapes. On the other hand, within the first group the metallic patches 26*a*, 26*b*, 26*c* are aligned on the x-direction, and similarly within the second group the metallic patches 26*d*, 26*e*, 26*f* are aligned on the x-direction.

On each of the metallic patches 26*a-f*, there are formed a plurality of metallic vias 28. For each of metallic patches 26*a*, 26*c*, 26*d*, 26*f* there are two metallic vias 28 formed thereon. For each of metallic patches 26*b*, 26*e* there are four metallic vias 28 formed thereon. Within the first group all the metallic vias 28 on the metallic patches 26*a*, 26*b*, 26*c* are aligned on the x-direction and form a straight line, and they are located near respective sides of the metallic patches 26*a*, 26*b*, 26*c* that are away from the virtual line 46. Similarly, within the second group all the metallic vias 28 on the metallic patches 26*d*, 26*e*, 26*f* are aligned on the x-direction and form a straight line, and they are located near respective sides of the metallic patches 26*d*, 26*e*, 26*f* that are away from the virtual line 46. As such, all the metallic vias 28 form two rows in the y-direction. All the metallic vias 28 extend through the first substrate layer 22 to a bottom side 22*b* of the first substrate layer 22, where the metallic vias 28 are shorted to an antenna ground plane.

The antenna ground plane is formed by a middle metal layer 34 that is shown in FIG. 1*c*. The middle metal layer 34 is interposed between the first substrate layer 22 and the second substrate layer 24. The above-mentioned metallic vias 28 are electrically connected to the middle metal layer 34 and their locations on the middle metal layer 34 are shown in FIG. 1*c*, which correspond fully to their locations on the metallic patches 26*a-f* as shown in FIG. 1*b*. In addition, there is a coupling slot 36 formed in the middle metal layer 34, and the coupling slot 30 which is in a rectangular shape has a length $L_{sl}$ and a width $W_{sl}$. The coupling slot 36 extends in the y-direction and passes through the center (not shown) of the middle metal layer 34. The coupling slot 36 is equidistant to the two rows of the metallic vias 28. As best seen in FIG. 1*d*, the coupling slot 36 has a projection in the horizontal plane that intersects with a microstrip feedline 40, and in particular the longitudinal direction of the coupling slot 36 forms a right angle with that of the microstrip feedline 40. Beside the metallic vias 28 which connect electrically to the top metal layer, on the middle metal layer 34 there are also formed metallic vias 32 that electrically connect the middle metal layer 34 to a bottom metal layer. There are two columns of metallic vias 32 separated from each other, with each column of metallic vias 32 forming a straight line along the x-direction.

The middle metal layer 34 as mentioned above is located at a bottom side 22*b* of the first substrate layer 22, and at the same time it is located at a top side 24*a* of the second substrate later 24. On a bottom side 24*b* of the second substrate later 24 there is configured the bottom metal layer, which includes the microstrip feedline 40 and a metallic pad 44, as shown in FIG. 1*d*. The microstrip feedline 40 is a 50-22 microstrip line, and has a length more than one half of the length of the second substrate layer 24 in the x-direction. The microstrip feedline 40 extends beyond a projected center (not shown) of the coupling slot 36 away from the metallic pad 44 by a length $L_1$. The metallic pad 44 is located at a side of the bottom side 24*b* where the metallic vias 32 are located. The metallic pad 44 defines a rectangular SMP (Sub Miniature Push-on) mounting area 42 which is adapted for a SMP connector (not shown) to connect thereto, and has a folding shape with a cavity 48 that is slightly wider than the microstrip feedline 40. The cavity 48 has its three sides surrounded by the rest of the metallic pad 44, and one open side that points to the microstrip feedline 40. The two columns of the metallic vias 32 are connected to the metallic pad 44 respectively on two sides of the cavity 48. The metallic vias 32 therefore extend through the second substrate layer 24.

Table I below shows the dimensions of the antenna 20 (as indicated in FIGS. 1*a*-1*d*) in one exemplary implementation.

TABLE I

EXEMPLARY DIMENSIONS OF THE ANTENNA

| Parameter | Value (mm) | Parameter | Value (mm) |
|---|---|---|---|
| $L_g$ | 36 | $L_1$ | 5 |
| $L_2$ | 5.8 | $L_{s1}$ | 5.6 |
| $W_1$ | 1.12 | $W_2$ | 3 |
| $W_3$ | 6.8 | $W_{s1}$ | 0.8 |
| $p_0$ | 0.9 | $p_1$ | 1 |
| $p_2$ | 2 | a | 15.9 |
| $H_1$ | 2.54 | $H_2$ | 0.508 |
| s | 0.7 | gap | 0.8 |
| d | 0.6 | | |

Figure 2A:
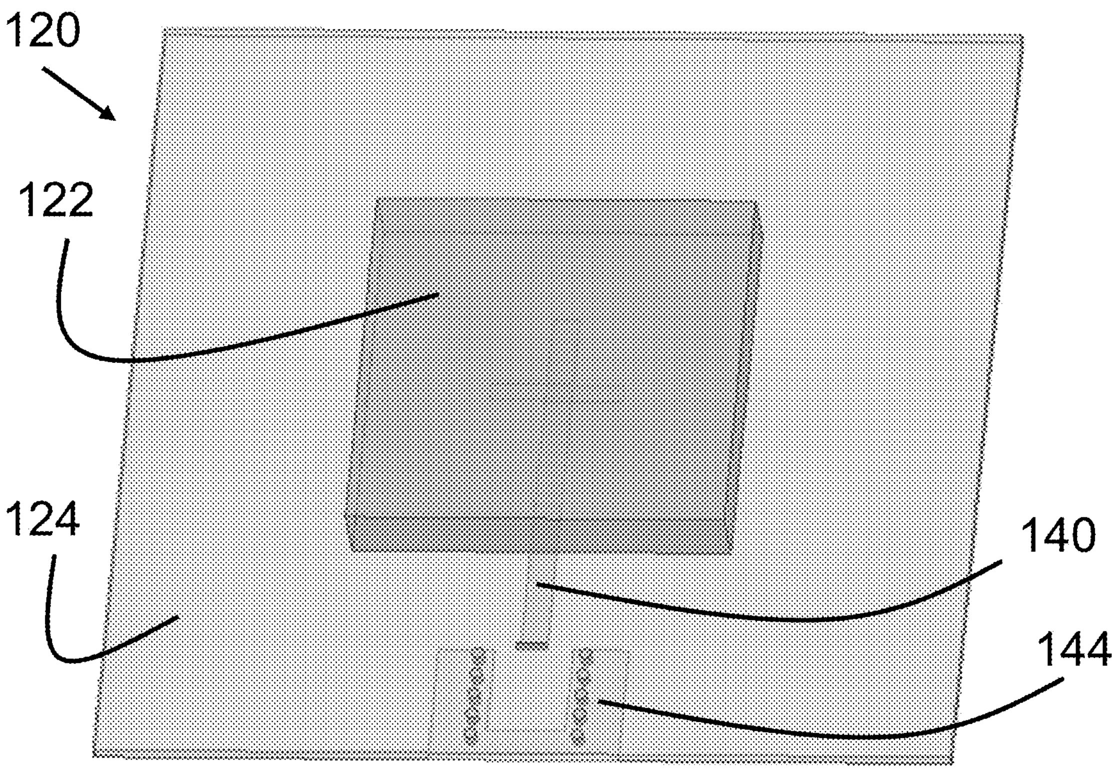
FIG. 2*a* shows a perspective view of a dielectric resonator antenna according to another embodiment of the invention.
Figure 2B:
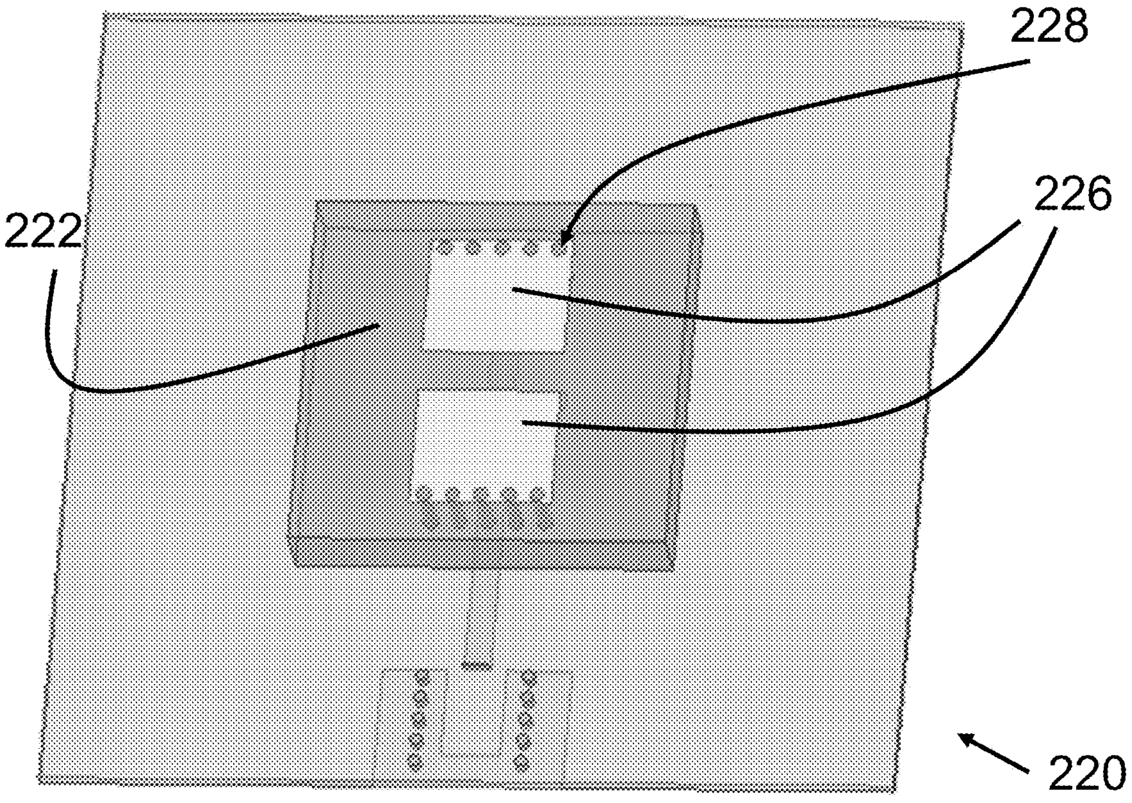
FIG. 2*b* shows a perspective view of a dielectric resonator antenna according to a further embodiment of the invention.
Figure 2C:
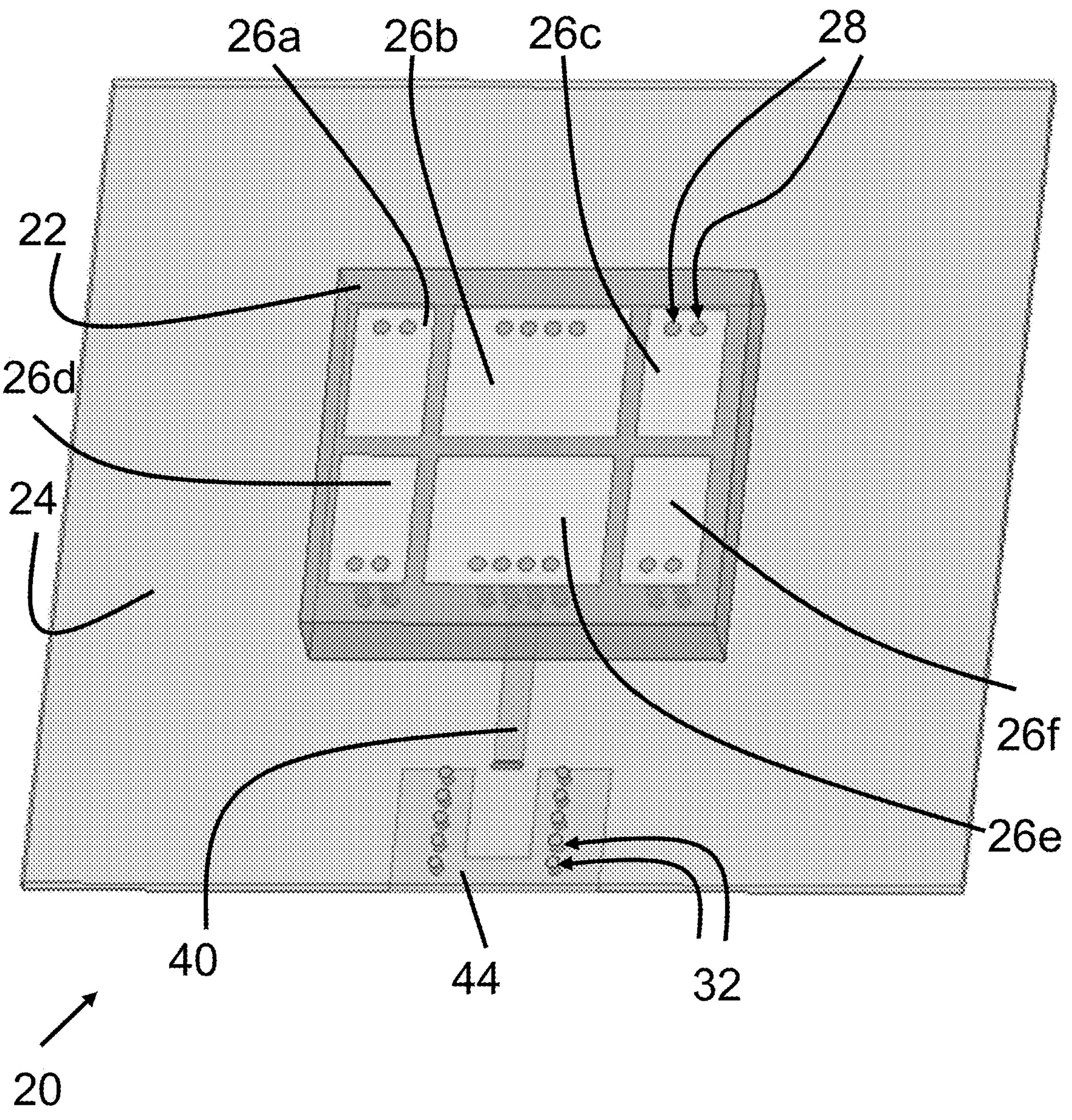
FIG. 2*c* shows a perspective view of the dielectric resonator antenna in FIGS. 1*a*-1*d*.

Turning to FIGS. 2*a*-2*c*, which depict the structural evolution of designs of dielectric resonator antennas according to embodiments of the invention. The evolution begins with a low-profile slot-coupled square DRA 120 as shown in FIG. 2*a*. The size of the DRA is kept unchanged throughout the evolution. It can be seen that in the DRA 120, there are a first substrate layer 122 and a second substrate layer 124, but there are no metallic vias or metallic patches on the first substrate layer 122. Nonetheless, the bottom metal layer including a microstrip feedline 140 and a metallic pad 144 similar to those shown in FIG. 1*d*. Based on the DRA 120, a DRA 220 is obtained by symmetrically introducing two shorted metallic patches 226 to a top of a first substrate layer 222. Each of the metallic patches 226 has a substantially square shape. Also, a plurality of metallic vias 228 are configured on the metallic patches 226 and through the first substrate layer 222. Next, based on the DRA 220 additional rectangular metallic patches are further added on the two sides of each of the substantially square patches to obtain the antenna 20 shown in FIG. 2*c*, which is the antenna shown in FIGS. 1*a*-1*d*.

Figure 3:
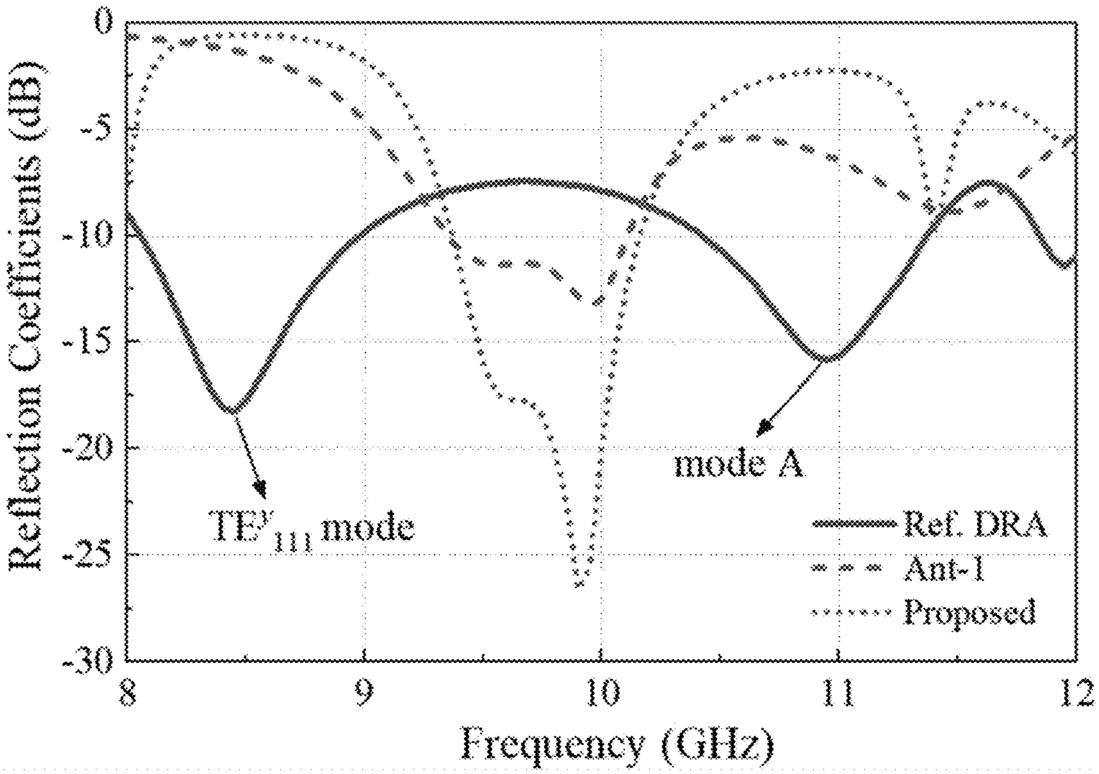
FIG. 3 shows simulated reflection coefficients of the three antennas in FIGS. 2*a*-2*c* respectively.

FIG. 3 shows the simulated reflection coefficients of the antenna in FIG. 2*a* (designated as "Ref. DRA" hereinafter), the antenna in FIG. 2*b* (designated as "Ant-1" hereinafter), and the antenna in FIGS. 1*a*-1*d* and 2*c* (designated as "Proposed" hereinafter). For Ref. DRA, the resonance mode at ~11 GHz cannot be predicted using the conventional DRA design formulas, and thus it is named as mode A in the following discussion. With reference to FIG. 3, the $TE^{y}_{111}$ mode and mode A are separated in Ref. DRA, but then almost combined in Ant-1 and the Proposed design. The resonance frequency of mode A shifts downwards due to the loading of metallic vias and patches. These shorted patches can be seen as a combination of the edge and top metal loading, which are widely used to miniaturize the DRA size [19].

Figure 4A:
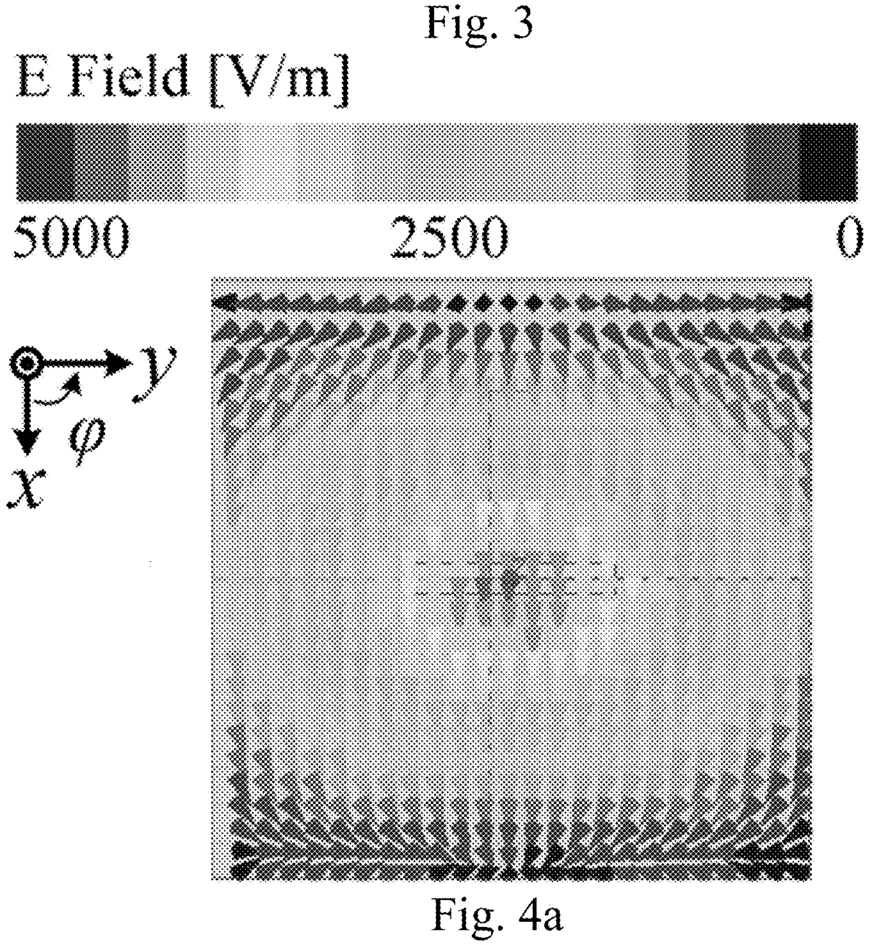
FIG. 4*a* shows the simulated E-field distributions in a top view of the antenna in FIG. 2*a* at 8.4 GHz.
Figure 4B:
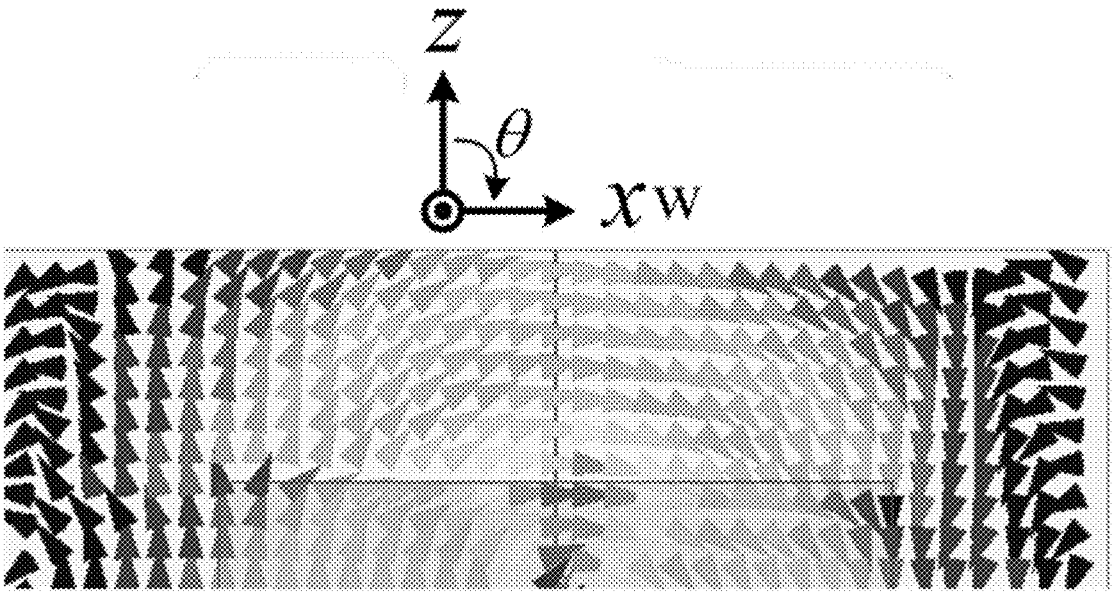
FIG. 4*b* shows the simulated E-field distributions in a side view of the antenna in FIG. 2*a* at 8.4 GHz.
Figure 4C:
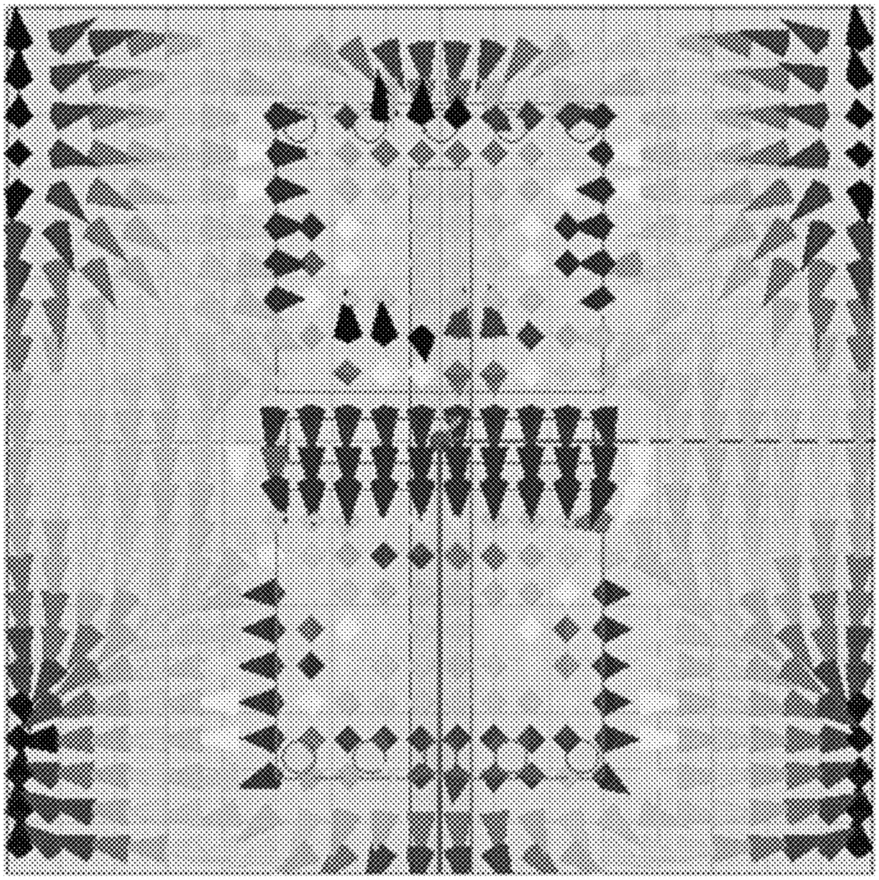
FIG. 4*c* shows the simulated E-field distributions in a top view of the antenna in FIG. 2*b* at 9.5 GHz.
Figure 4D:
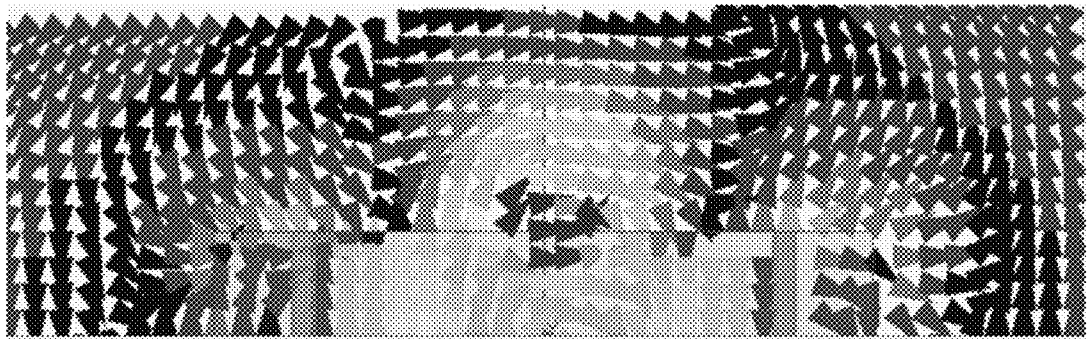
FIG. 4*d* shows the simulated E-field distributions in a side view of the antenna in FIG. 2*b* at 9.5 GHz.
Figure 4E:
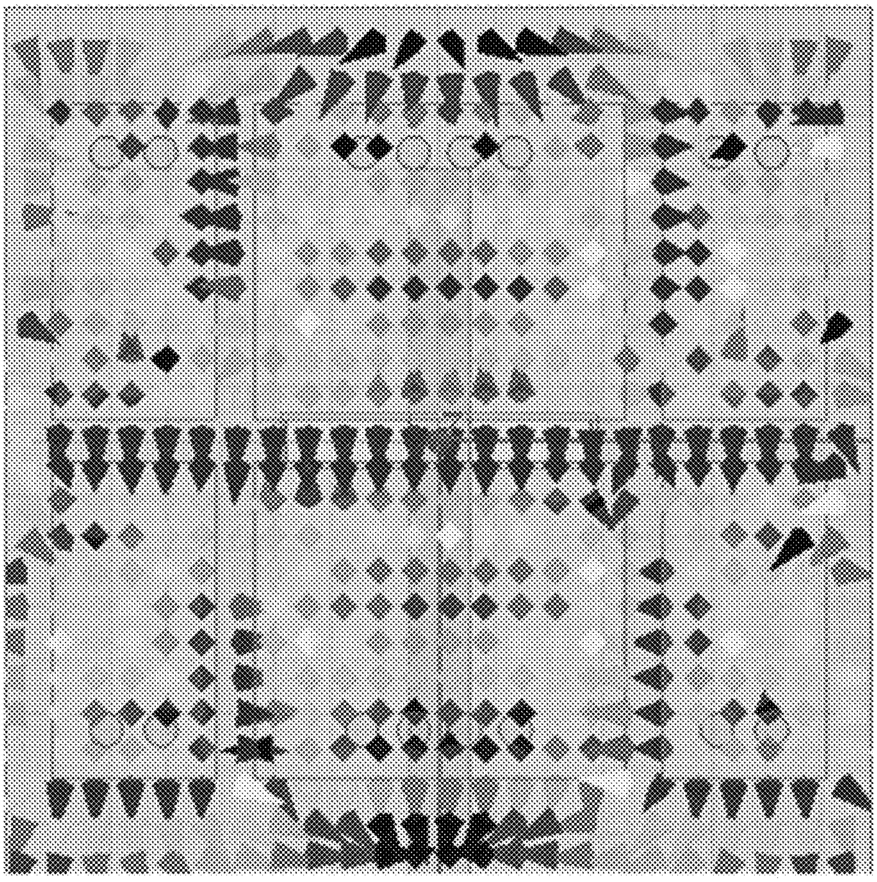
FIG. 4*e* shows the simulated E-field distributions in a top view of the antenna in FIG. 2*c* at 9.5 GHz.
Figure 4F:
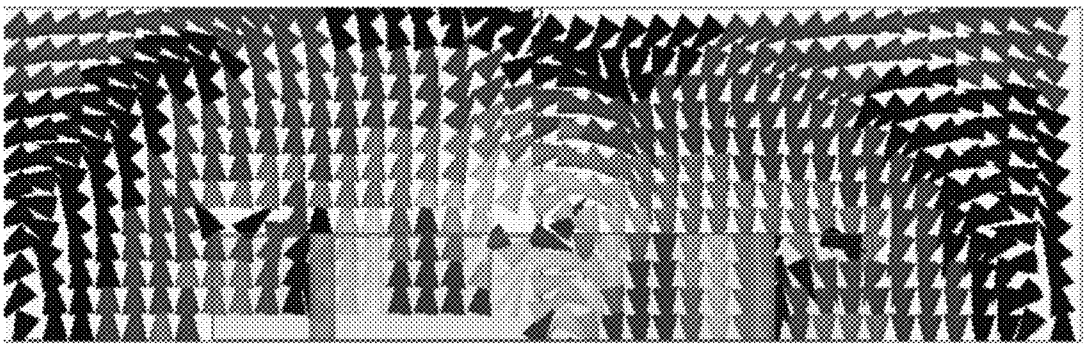
FIG. 4*f* shows the simulated E-field distributions in a side view of the antenna in FIG. 2*c* at 9.5 GHz.
Figure 4G:
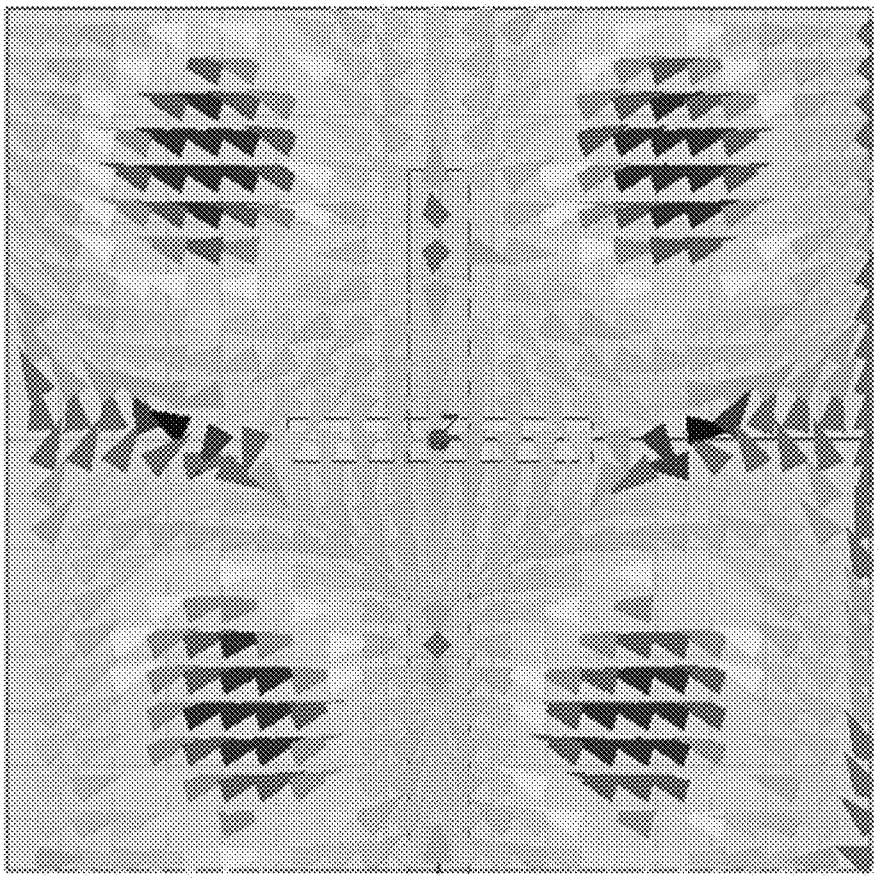
FIG. 4*g* shows the simulated E-field distributions in a top view of the antenna in FIG. 2*a* at 11 GHz.
Figure 4H:
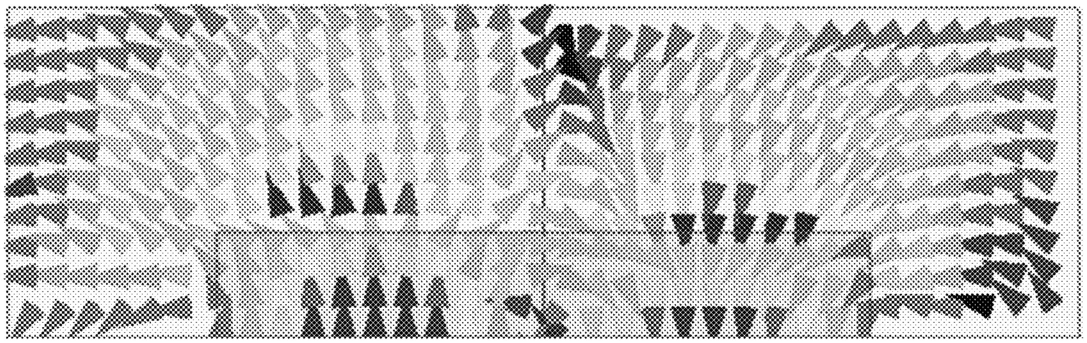
FIG. 4*h* shows the simulated E-field distributions in a side view of the antenna in FIG. 2*a* at 11 GHz.

FIGS. 4*a*-4*l* show the simulated E-field distributions of Ref. DRA, Ant-1, and the Proposed DRA at their resonance frequencies. The plotting scale shown in FIG. 4*a* applies to all of FIGS. 4*a*-4*l*. All top views in FIGS. 4*a*, 4*c*, 4*e*, 4*g*, 4*i*, 4*k* are the views at the same angle when looking into the positive z-direction. All side views in FIGS. 4*b*, 4*d*, 4*f*, 4*h*, 4*j*, 41 are the views at the same angle when looking into the positive y-direction. With reference to FIGS. 4*a*-4*b*, the first resonance mode of Ref. DRA is caused by the $TE^{y}_{111}$ mode. The E-field distribution after adding a pair of shoring patches is shown in FIGS. 4*c*-4*d*. Because of the shoring vias, the E-field along the x-direction is more concentrated near the central region (see FIG. 4*d*), causing the resonance frequency of the $TE^{y}_{111}$ mode to shift upwards (see FIG. 3). In contrast, the E-field region along the y-direction remains almost unchanged. It means that the y-direction electrical size of Ant-1 is larger than that of Ref. DRA at the shifted resonance frequency and hence, Ant-1 has a higher gain. With reference to FIGS. 4*c*-4*d*, it is worth noting that the strong y-directed E-fields at the patch edges are caused by the metallic patches. For each patch, E-field vectors at the two patch edges have the same amplitude but opposite directions. Thus, their radiated fields will cancel each other in the far field, desirably having negligible influences on the radiation pattern. With reference to FIGS. 4*e*-4*f*, the additional patches near the four DRA corners enhance the x-directed E-field of the DRA edges, effectively increasing the radiation aperture and hence the antenna gain.

Next, the second resonance mode (mode A) of Ref. DRA is discussed in FIGS. 4*g*-4*h*. With reference to these two figures, it is interesting to note from the top view that the E-fields in any two horizontal or vertical adjacent quadrants have the same amplitude but opposite directions, ideally giving zero net radiation and thus no influence on the far-field radiation. As a result, the radiation pattern and antenna gain are predominantly determined by the x-directed E-fields. Therefore, to increase the antenna gain, the y-directed E-field should be converted to x-directed E-field as far as possible.

Figure 4I:
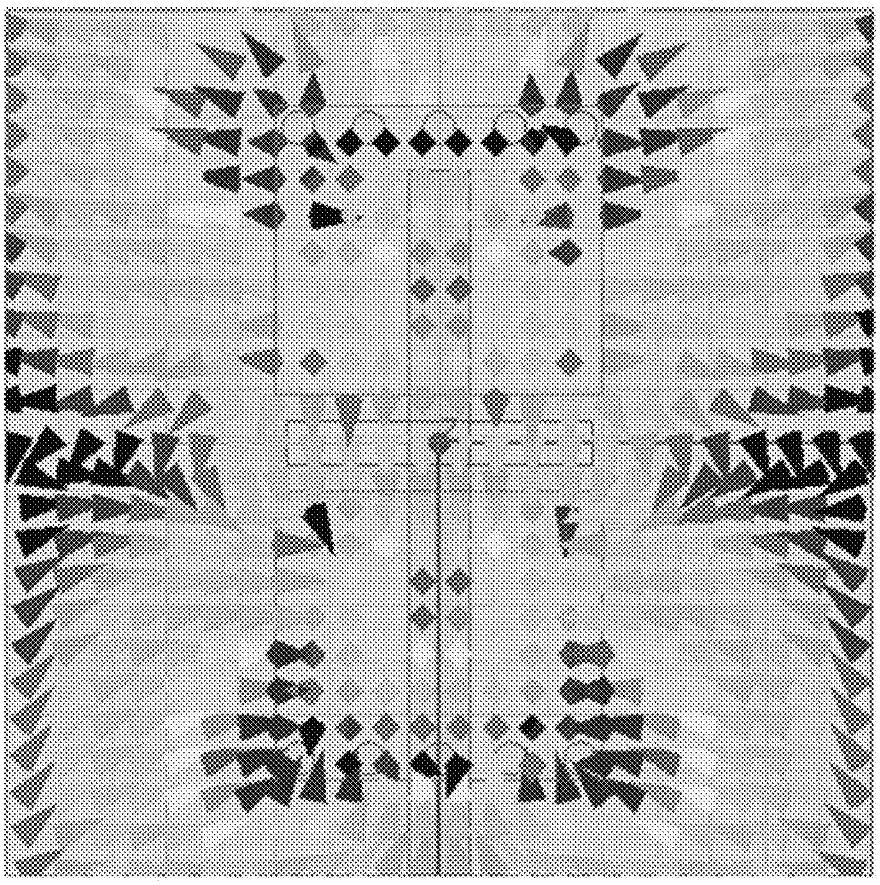
FIG. 4*i* shows the simulated E-field distributions in a top view of the antenna in FIG. 2*b* at 9.9 GHz.
Figure 4J:
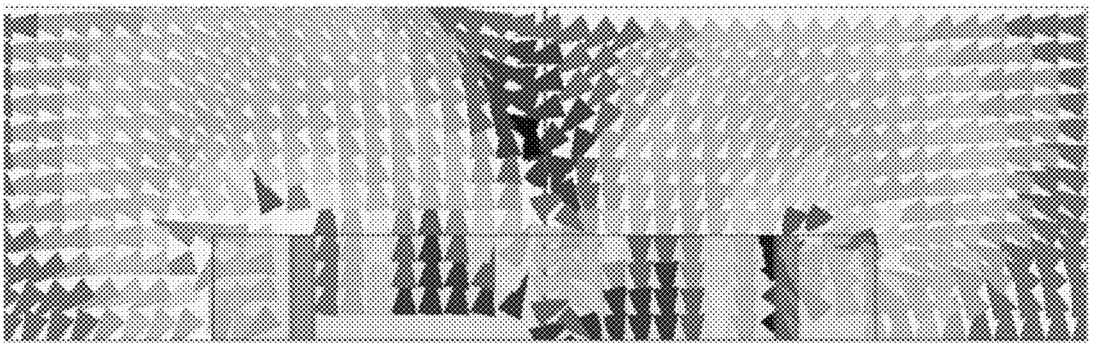
FIG. 4*j* shows the simulated E-field distributions in a side view of the antenna in FIG. 2*b* at 9.9 GHZ.
Figure 4K:
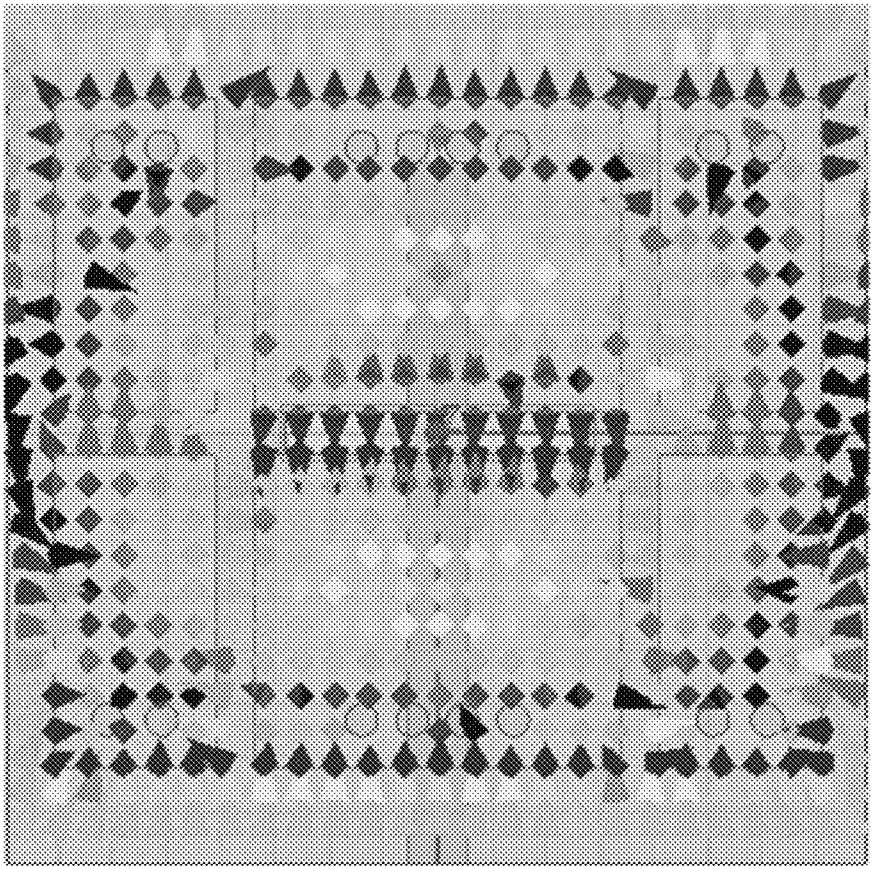
FIG. 4*k* shows the simulated E-field distributions in a top view of the antenna in FIG. 2*c* at 9.9 GHz.
Figure 4L:
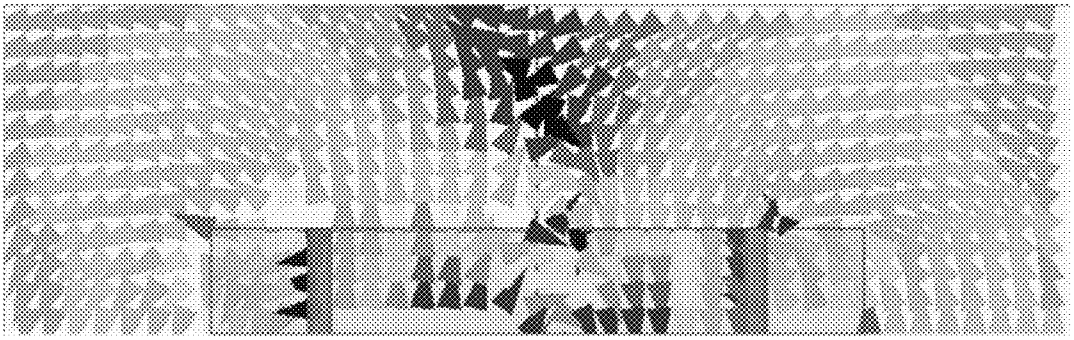
FIG. 4*l* shows the simulated E-field distributions in a top view of the antenna in FIG. 2*c* at 9.9 GHZ.

This can be achieved by using the shorted metallic patches, as shown in FIGS. 4*i*-4*j*. With reference to FIGS. 4*k*-4*l*, by introducing the additional patches, the y-directed E-fields are further weakened, and more energy desirably goes into the x-directed E-fields. As a result, the antenna gain is further increased.

Figure 5:
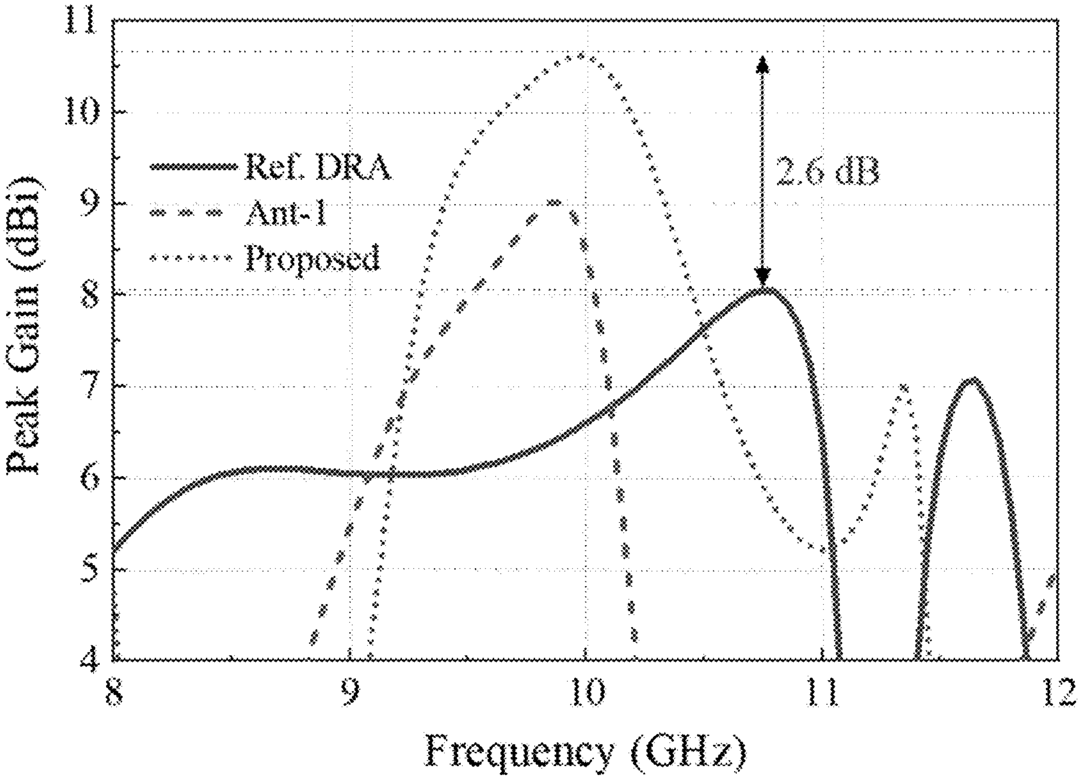
FIG. 5 shows simulated peak co-polarized gains of the three antennas in FIGS. 2*a*-2*c* respectively.
Figure 6:
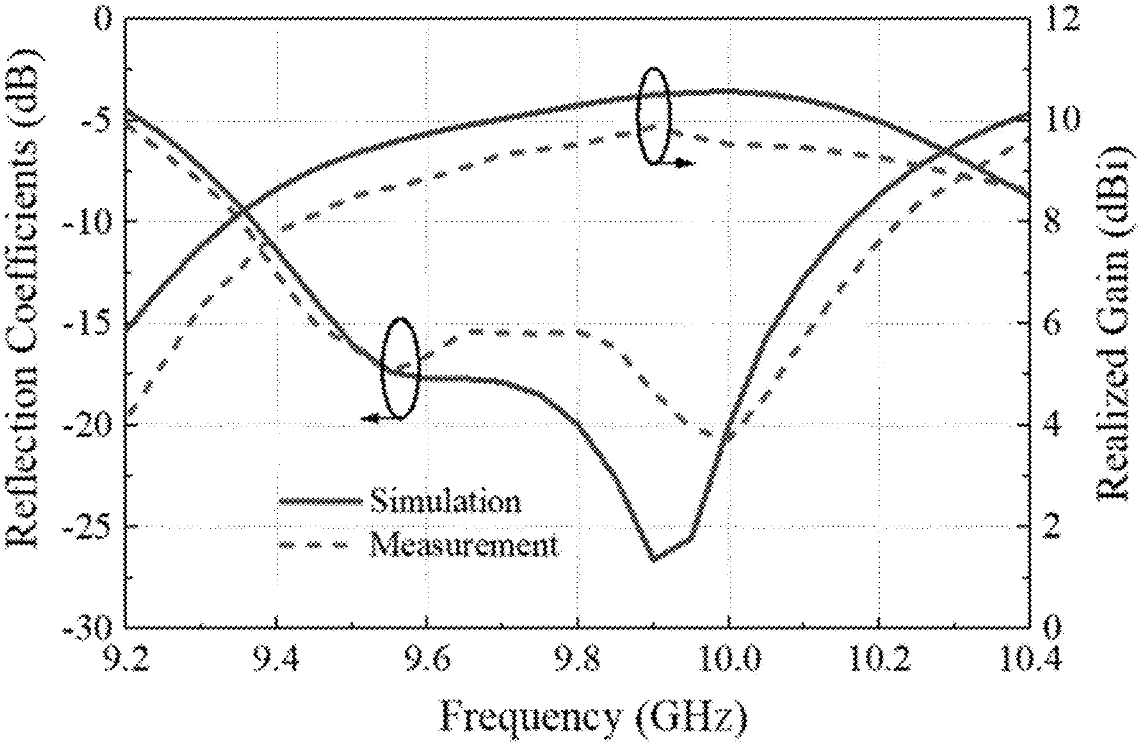
FIG. 6 illustrates measured and simulated reflection coefficients and realized gains of the antenna in FIGS. 1*a*-1*d* and 2*c*.

FIG. 5 shows the simulated boresight gains of Ref. DRA, Ant-1, and the Proposed DRA. As shown in the figure, the peak gain of Ant-1 is shifted downwards from that of Ref. DRA. Besides, the peak value of the former one is increased from the latter one by ~1 dB. The peak gain of the Proposed design is further increased by ~1.6 dB from that of Ant-1, with the resonance frequency almost unchanged. An overall increased gain of ~2.6 dB can be found in the Proposed design.

For the purpose of conducting measurements of the Proposed antenna in experiments setup, a prototype of the Proposed antenna is made, which has the general appearance similar to that shown in FIG. 2*c*. The prototype is compact, with a footprint of $0.52 \times 0.52\lambda_0^2$ and a profile of $0.1\lambda_0$. The reflection coefficient of the prototype was tested with an Agilent VNA E5230A, whereas the radiation characteristics were measured with a Satimo StarLab system.

Figure 7:
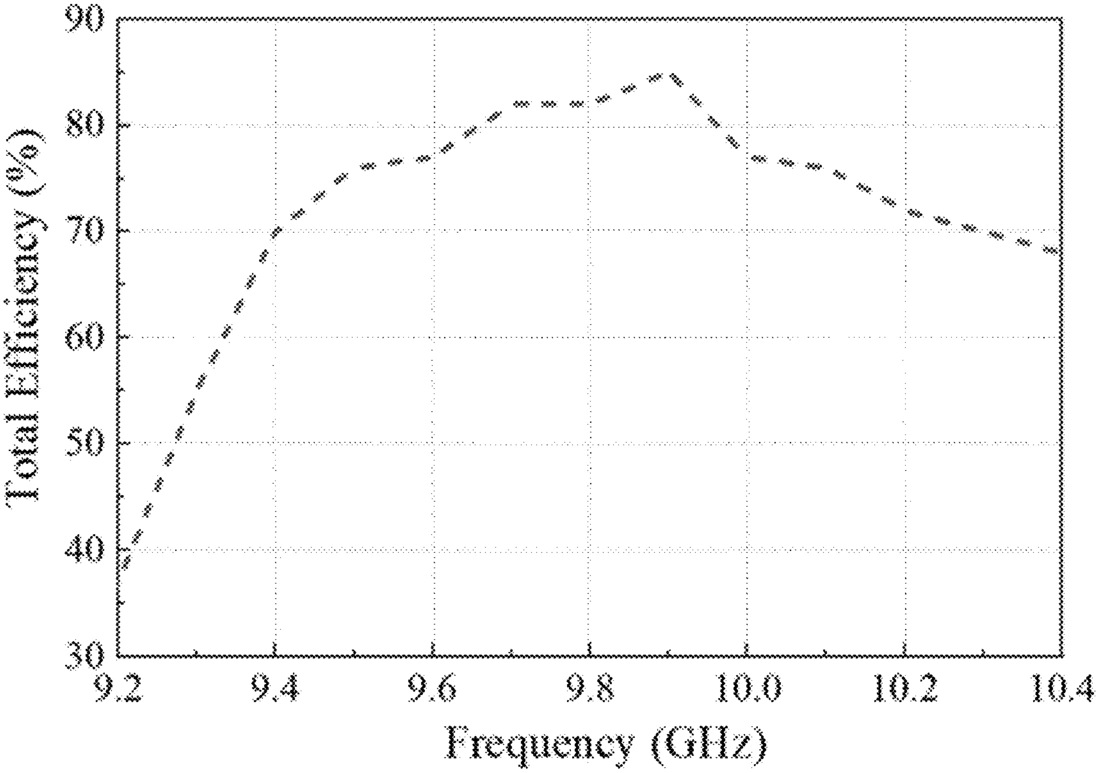
FIG. 7 illustrates measured total efficiency of the antenna in FIGS. 1*a*-1*d* and 2*c*.
Figure 8A:
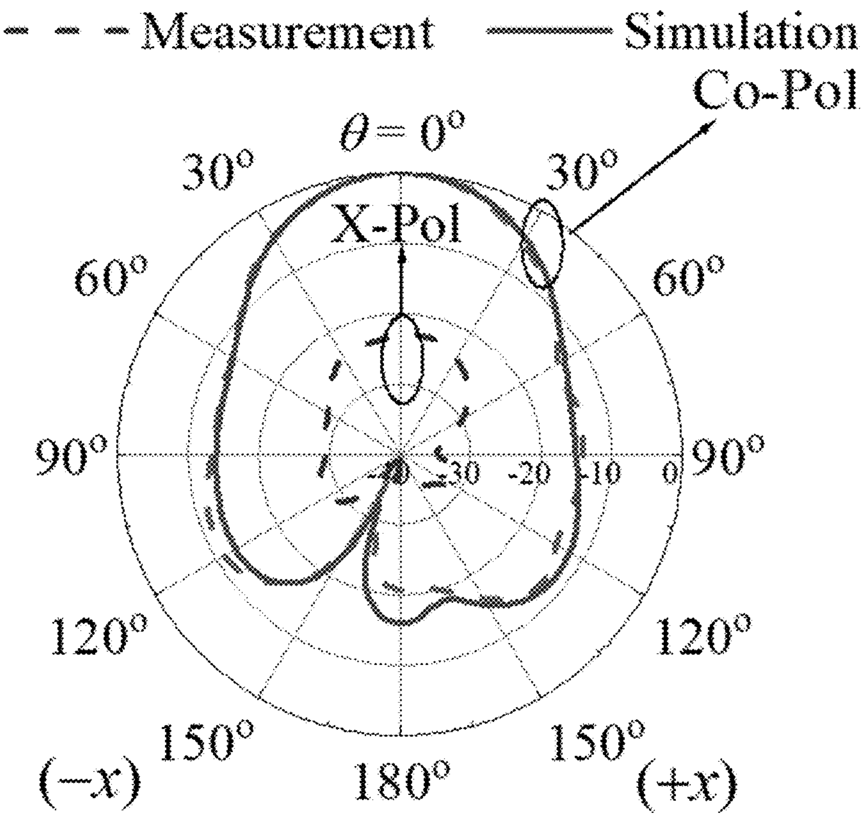
FIG. 8*a* illustrates measured and simulated normalized E-plane radiation patterns of the antenna in FIGS. 1*a*-1*d* and 2*c* at 9.6 GHz.
Figure 8B:
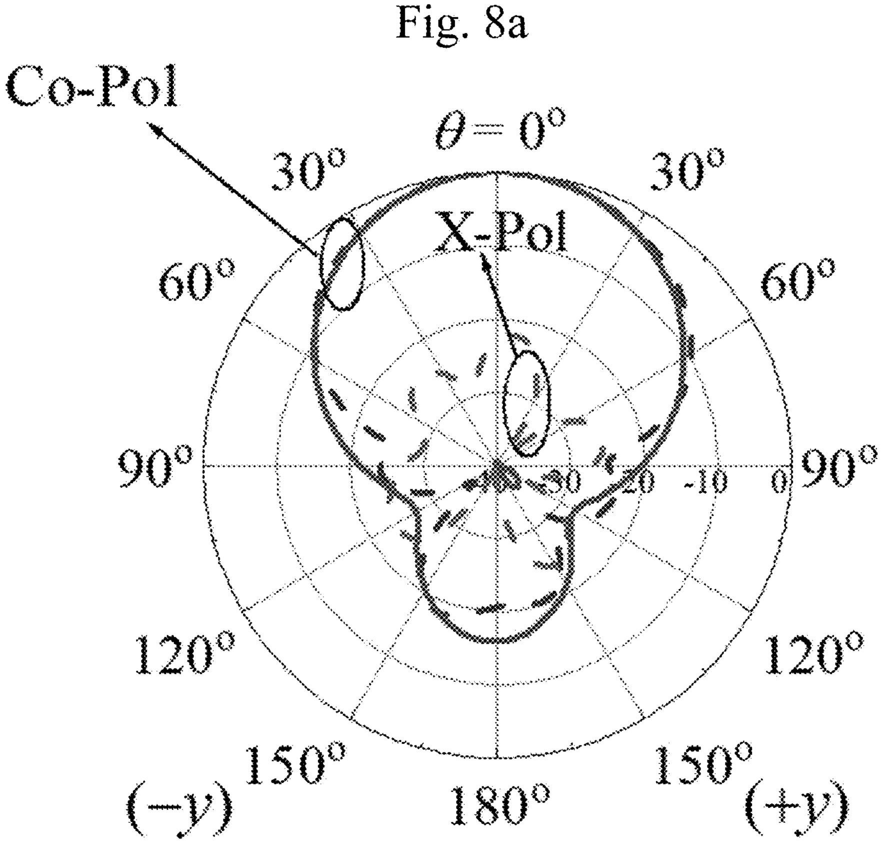
FIG. 8*b* illustrates measured and simulated normalized H-plane radiation patterns of the antenna in FIGS. 1*a*-1*d* and 2*c* at 9.6 GHz.
Figure 8C:
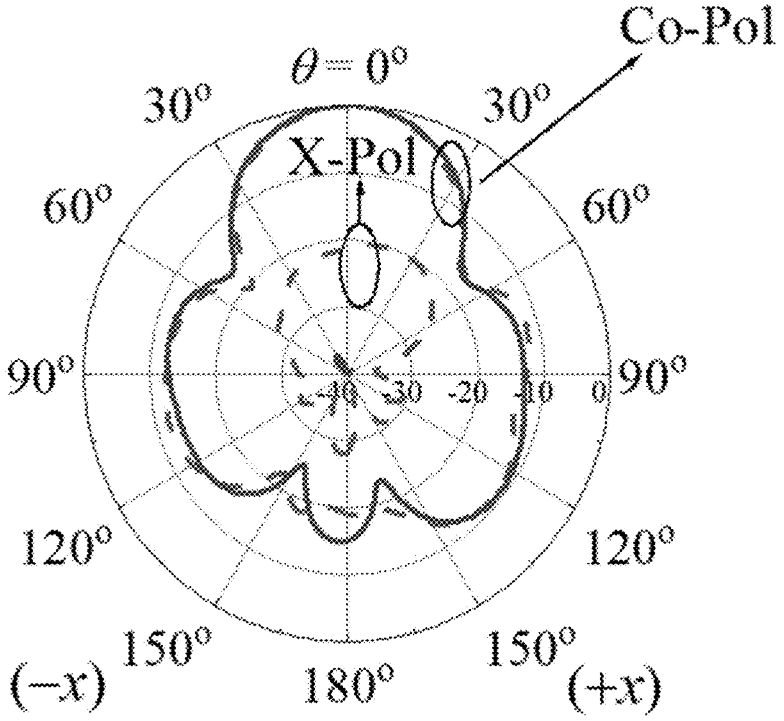
FIG. 8*c* illustrates measured and simulated normalized E-plane radiation patterns of the antenna in FIGS. 1*a*-1*d* and 2*c* at 10 GHz.
Figure 8D:
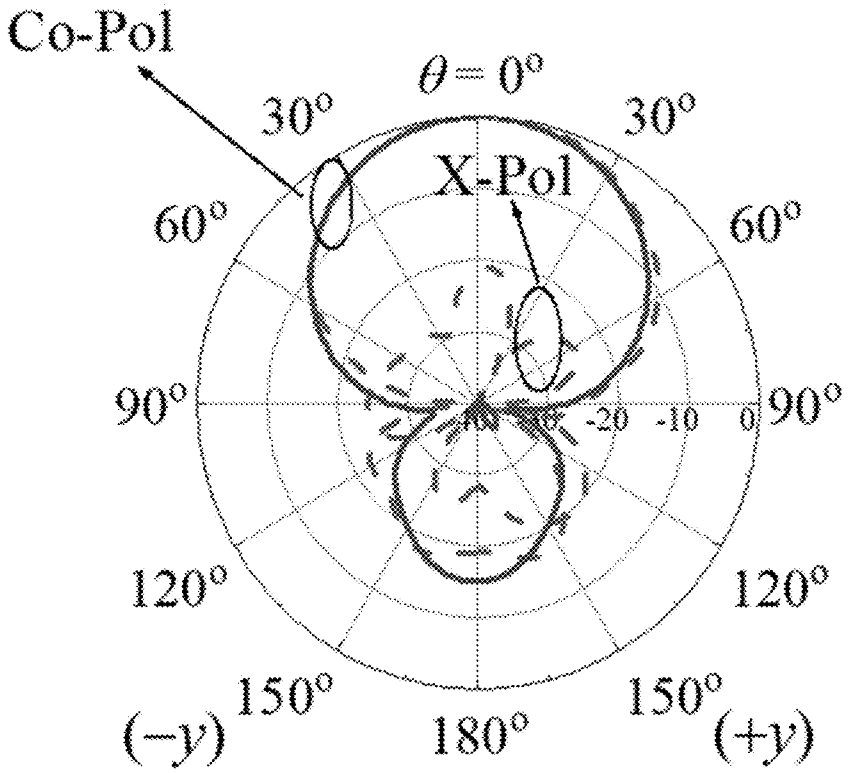
FIG. 8*d* illustrates measured and simulated normalized H-plane radiation patterns of the antenna in FIGS. 1*a*-1*d* and 2*c* at 10 GHz.

The reflection coefficients and peak realized gains of the Proposed antenna are illustrated in FIG. 7, both in terms of measured and simulated values. The measured and simulated 10-dB impedance bandwidths are 8.8% (9.36-10.22 GHz) and 8.1% (9.37-10.16 GHz), respectively. With reference to the figure, the measured and simulated peak gains are 9.9 dBi and 10.6 dBi, respectively. The measured gain deviation is mainly due to the fabrication tolerance and experimental errors. FIG. 8 shows the measured efficiency of our metal-loaded DRA, with a peak efficiency of ~85%.

FIG. 9 shows the normalized measured and simulated radiation patterns at two resonances. As can be seen from the figure, broadside radiation patterns are obtained with a peak sidelobe level of less than-10 dB for both frequencies. Also, the co-polarization fields are larger than the cross-polarization fields by 21 dB at the boresight direction in both planes. It is worth mentioning that the proposed method can be extended to array design for even higher antenna gains.

Table II below compares the Proposed design with some reported DRAs. With reference to the table, the Proposed DRA (indicated as "This work" in Table II) has a relatively high antenna gain while maintaining a small antenna size. Moreover, the Proposed DRA is totally fabricated using low-cost PCB technology. DRAs of [7] and [12] have higher peak gain at the cost of larger antenna size, and the prototypes are processed with traditional ceramic technology. Although designs of [17] and [18] are fabricated using PCB technology, their peak gains are only ~8 dBi.

TABLE II

COMPARISON WITH OTHER REPORTED DRAS

| Ref. | Frequency (GHz) | Peak gain (dBi) | Profile ($\lambda_0$) | Volume* ($\lambda_0^3$) | PCB fabrication |
|---|---|---|---|---|---|
| [7] | 10.75 | 10.2 | 1.08 | 0.035 | No |
| [12] | 5 | 10.5 | 0.10 | 0.059 | No |
| [13] | 4.7 | 8.8 | 0.07 | 0.035 | No |
| [14] | 11.05 | 6.3 | 0.09 | 0.012 | No |
| [17] | 20 | 8 | 0.10 | 0.044 | Yes |
| [18] | 34.75 | 8.1 | 0.13 | 0.017 | Yes |
| This work | 9.8 | 9.9 | 0.10 | 0.027 | Yes |

*Volume = profile × footprint (main radiator)

In summary, various embodiments of the invention provide a low-profile gain-enhanced DRA using metal loading. The structural evolution of the Proposed DRA has been discussed in detail. The Ref. DRA deploys an aperture-coupled square DRA. By loading shorted metallic patches to the Ref. DRA properly, the E-field distributions of its two resonance modes are changed greatly, resulting in an enhanced gain. To further increase the gain, additional shorted patches are introduced near the four corners of the top DRA surface. To verify the approach, an X-band prototype was fabricated using cost-effective PCB technology, having a footprint of $0.52 \times 0.52\lambda_0^2$ and a profile of $0.1\lambda_0$. It is found that a realized gain of 9.9 dBi can be measured with the prototype. Based on these characteristics, various antennas provided by embodiments of the invention are promising solutions for gain-enhancing applications.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

The first and second substrate layers as shown in FIG. 1*a*-2*c* all have square shapes, with a certain ratio of area between the two. However, those skilled in the art should realize that one or both of the substrate layers may be in other shapes, such as rectangle, cylinder, hemisphere, and ring. The dielectric constants of the first and second substrate layers may also differ from those described in the preferred embodiments of the invention. The operating frequency of the DRA could also be changed to other frequency bands than those described in the preferred embodiments of the invention.

In the embodiments described, two or six metallic patches are configured on a top side of the first substrate layer, but the number is not intended to be limiting. In variations of the preferred embodiments of the invention, more or less metallic patches could be configured as the top metal layer, and that their shapes could be different from what are shown. For example, one or more of the metallic patches may be in a circular, ring or elliptical shape. Similarly, on each of the metallic patches there are configured two or four shorting metallic vias as shown in FIGS. 1*b* and 2*c*, but those skilled in the art should realize that more or less vias could configured, and their individual size, alignment and/or locations need not to follow exactly those shown in FIGS. 1*b* and 2*c*.

The microstrip feedlines in FIGS. 1*d* and 2*a*-2*c* are shown with a certain shape. One should understand that the invention is not limited by these shapes of the feedlines. Rather, microstrip feedlines of other shapes can also be configured in the antennas. The invention is furthermore not limited by the excitation method of the DRA, i.e., slot feed, conformal feed, probe feed or any other suitable method can be used. Likewise, the coupled slot in the middle metal layer of the antenna could be changed to different shapes or dimensions in variations of the preferred embodiments, for example it could be in H-shape or Z-shape.

What is claimed is:

1. A substrate-integrated dielectric resonator, comprising:

a) a first substrate layer having a first dielectric constant;

b) a plurality of metallic patches on a first side of the first substrate layer; the plurality of metallic patches shorted to ground; the plurality of metallic patches separated from each other;

wherein on each of the plurality of metallic patches, there is formed a plurality of metallic vias that extend through the first substrate layer; the plurality of metallic vias on at least two of the metallic patches being aligned along a straight line that is parallel to the first side of the first substrate layer; and wherein each of the plurality of metallic patches has a substantially square or rectangular shape; the plurality of metallic vias on each of the plurality of metallic patches being aligned parallel to and closer to one of four sides of the substantially square or rectangular shape than others of the four sides.

2. The substrate-integrated dielectric resonator of claim 1, wherein at least one of the plurality of metallic patches has a substantially square shape, and at least another one of the plurality of metallic patches has a rectangular shape.

3. The substrate-integrated dielectric resonator of claim 1, wherein a number of the plurality of metallic patches is six.

4. The substrate-integrated dielectric resonator of claim 3, wherein the plurality of metallic patches together define a substantially square shape on the first side of the first substrate layer.

5. The substrate-integrated dielectric resonator of claim 3, wherein adjacent ones of the plurality of metallic patches are separated from each other at a same distance.

6. The substrate-integrated dielectric resonator of claim 3, wherein the plurality of metallic patches comprises a first group of the metallic patches and a second group of the metallic patches; the first group and the second group being symmetrical to each other about a virtual line that passes through a center of the first substrate layer.

7. The substrate-integrated dielectric resonator of claim 6, wherein each of the first group and the second group comprises three said metallic patches, including two rectangular metallic patches and a substantially square metallic patch placed in-between.

8. The substrate-integrated dielectric resonator of claim 6, wherein the metallic vias on the metallic patches in the first group are symmetrical to the metallic vias on the metallic patches in the second group being aligned about the virtual line.

9. A dielectric resonator antenna, comprising:

c) the substrate-integrated dielectric resonator of claim 1; and d) a second substrate layer arranged on a second side of the first substrate layer of the substrate-integrated dielectric resonator; the second substrate layer further comprising:

i) a microstrip feedline; and ii) an antenna ground plane.

10. The dielectric resonator antenna of claim 9, wherein the second substrate layer has a second dielectric constant which is smaller than the first dielectric constant of the first substrate layer of the substrate-integrated dielectric resonator.

11. The dielectric resonator antenna of claim 9, wherein the second substrate layer comprises a middle metal layer and a bottom metal layer respectively located on two sides of the second substrate layer.

12. The dielectric resonator antenna of claim 11, wherein the middle metal layer is configured on one of the two sides of the second substrate layer that is facing and in contact with the second side of the first substrate layer; the middle metal layer acting as the antenna ground plane.

13. The dielectric resonator antenna of claim 12, wherein the middle metal layer is formed with a coupling slot that has a longitudinal direction intersecting with that of the microstrip feedline.

14. The dielectric resonator antenna of claim 12, wherein the middle metal layer is in electrical connection with a plurality of metallic vias that extend through the first substrate layer.

15. The dielectric resonator antenna of claim 11, wherein the microstrip feedline is part of the bottom metal layer.

16. The dielectric resonator antenna of claim 15, wherein the bottom metal layer further comprises a metallic pad as a mounting area for an external connector.

* * * * *